Feb. 23, 1954 J E. COATES 2,670,018
ROTARY CUTTING TOOL
Filed Sept. 30, 1949 2 Sheets-Sheet 1
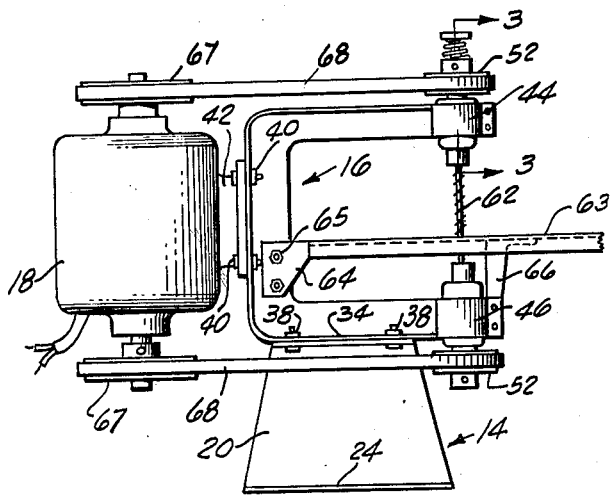
Fig. 1.
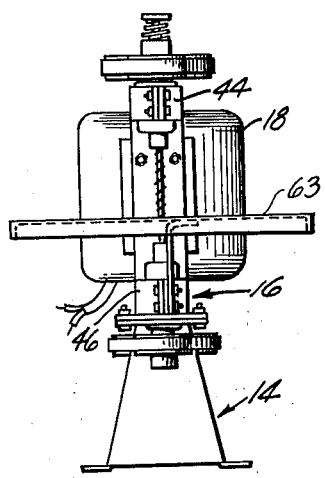
Fig. 2.
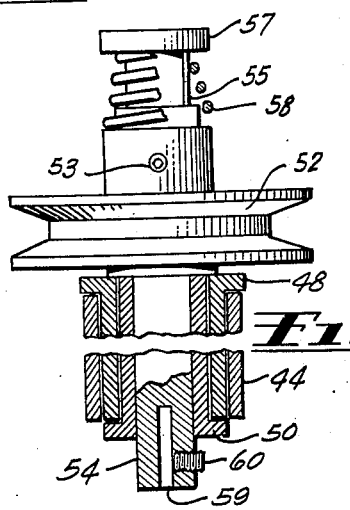
Fig. 3.
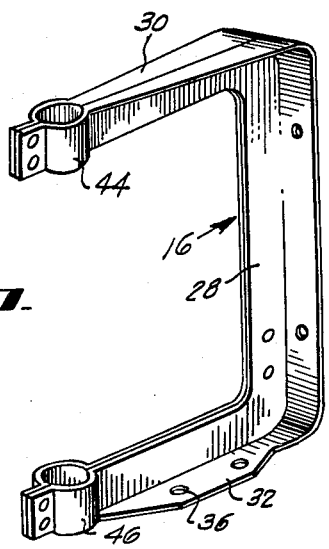
Fig. 4.
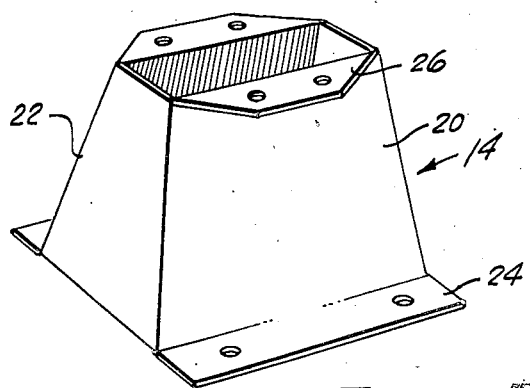
Fig. 5.
Fig. 11.
INVENTOR
J. Edwin Coates

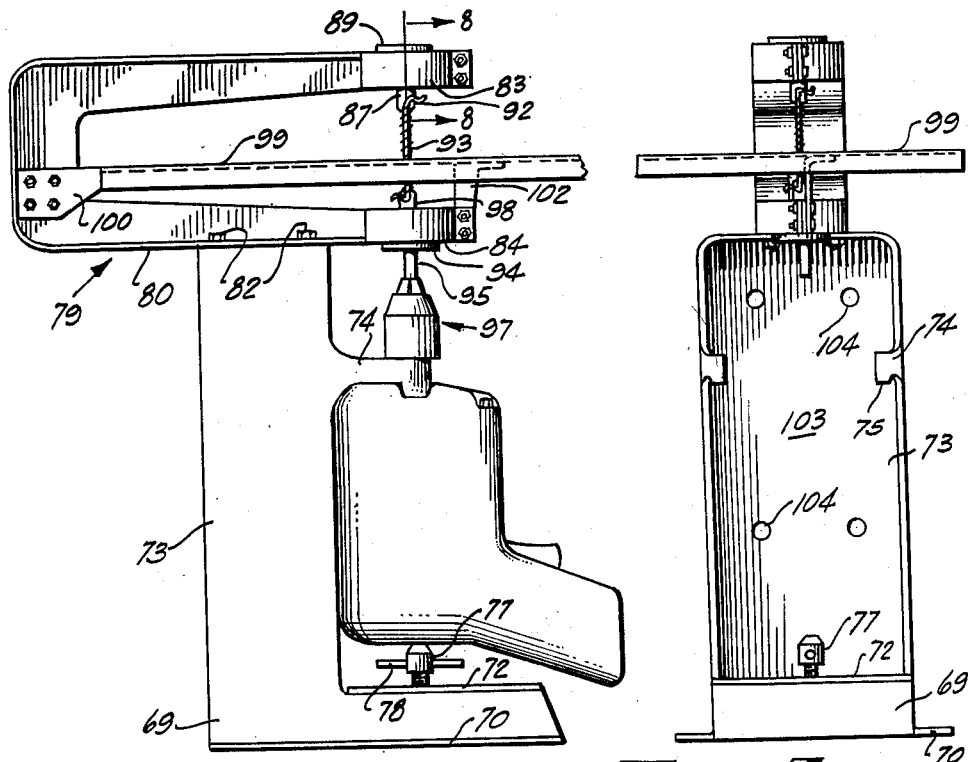
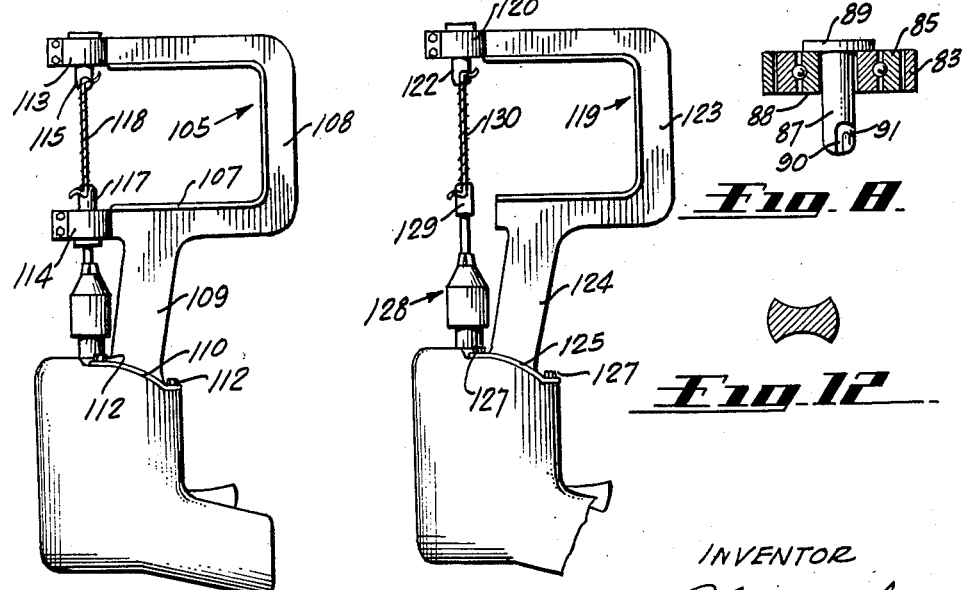

Patented Feb. 23, 1954

2,670,018

UNITED STATES PATENT OFFICE 2,670,018

ROTARY CUTTING TOOL

J. Edwin Coates, Santa Monica, Calif., assignor to Alta Engineering Company, Santa Monica, Calif., a limited partnership of California Application September 30, 1949, Serial No. 118,841

10 Claims. (Cl. 143—33)

This invention relates to cutting tools primarily intended for cutting wood and other non-metallic materials and is generally of the severing type as opposed to the material removing type.

There are several classes of severing tools of which the most common are the disk or circular saw and the band saw. The former is practically limited to straight line cutting while the latter can readily sever material along an irregular pattern line.

The conventional band saw is a very satisfactory tool for its purpose but has several disadvantages. It requires the use of a complete unbroken band loop, usually at least twenty-four inches in length, and must operate over a pair of rather large pulleys even tho its cutting work is done in a vertical space seldom exceeding an inch. If a band breaks, it must be welded or brazed together and ground smooth with special equipment or replaced with a new band at considerable expense. Because of the forces involved and the driving mechanism which is necessary, a complete band saw must be quite heavy and accordingly expensive from the viewpoint of the hobbyist. Moreover it can cut in only a single direction and therefore a workpiece must be swung to different positions to cut along an irregular line. If a work piece is long and slender it is impossible to make even a shallow cut at right angles to its long edge because the supporting arm for the upper portion of the machine will interfere with movement of the piece into the cutting zone.

The novel device disclosed herein overcomes the objections mentioned above and provides an ideal tool for the home workshop hobbyist at very little expense. These results are accomplished by eliminating the axially moving toothed band and using in its stead a slender filamentary element having cutting edges at its surface and adopted to rotate about its own axis.

In one form of the invention the cutting element is carried at its ends in vertically spaced and vertically aligned bearings at the free ends of a C-shaped frame and passes thru a work-supporting table mounted in the open jaw of the frame. Rotary driving means is connected to one or both of the ends of the cutting element to rotate it at high speed around its own axis. Since its cutting edges face in all directions as it rotates, it is possible to cut along the most irregular pattern line and even reverse thru one hundred eighty degrees without changing the direction of heading of the work piece, regardless of its length. Consequently interference with the supporting arm for the upper portion is eliminated.

The arrangement described above eliminates the conventional upper and lower pulleys lying in a vertical plane and makes possible a machine of minimum vertical extent. The total length of the cutting blade for the machine need not exceed about three inches and it can be made of the same general class of steel as coping saw blades. Such blade is very inexpensive and can be readily replaced when broken or worn, thus obviating the cost and inconvenience of repairing the conventional band saw loops.

One of the more important advantages of this basically different type of cutting tool is the fact that it can readily be built as an attachment to be mounted directly on a standard type of electric drill such as the Black and Decker Company product currently known as the "Home Utility" quarter inch drill. While the framework may be a casting or forging, or even heavy wire, it is presently preferred to make it of sheet metal.

The blade should make as narrow a cut as possible and very satisfactory results can be achieved with a blade having a diameter or lateral dimension of the order of one-sixteenth inch or less. Because of the extremely small diameter it is desirable to use rotational speeds of 5000 revolutions per minute or more but good results have been obtained at lower speeds.

Several presently preferred forms of the invention are illustrated in the attached drawings in which:

Figure 1 is a side elevational view of one form of the invention incorporating a self supporting stand and a belt drive;

Figure 2 is a front elevational view of the machine of Figure 1;

Figure 3 is an elevational view, partly in section, taken on line 3—3 of Figure 1, of the upper support for the cutting blade;

Figure 4 is a perspective view of the blade carrying frame;

Figure 5 is a perspective view of the base for the machine of Figure 1;

Figure 6 is a side elevational view of a modified form of the invention incorporating a stand for mounting a conventional electric drill as a power source;

Figure 7 is a front elevational view of the device of Figure 6 with the motor omitted;

Figure 8 is a sectional view taken on line 8—8 of Figure 6;

Figure 9 is a side elevational view of a modified form of the invention mounted on a conventional electric drill to produce a portable cutting tool;

Figure 10 is a side elevational view showing a modification of the attachment of Figure 9;

Figure 11 is a sectional view, greatly enlarged, of an alternate form of cutting blade; and Figure 12 is a sectional view, greatly enlarged, of another alternate form of cutting blade.

The cutting tool illustrated in Figures 1 and 2 includes a base 14 supporting a frame 16 on which is mounted a driving motor 18. The base, more completely illustrated in Figure 5, comprises a truncated rectangular pyramid of sheet metal having side walls 20, 22, base flanges 24, and top flanges 26, the flanges being pierced for attachment to a support and to the frame 16 respectively.

The U-shaped frame 16, best shown in Figure 4, is preferably formed of two angular elements of sheet metal which are symmetrical about the central plane of the frame. The two elements 28, 30 are joined by spot welding, riveting, or the like to form in effect a single member having a T-shaped cross-section for rigidity. The bottom flanges 32, 34 are pierced at 36 to take bolts 38 for rigidly connecting the frame to the base. The flanges on the base of the U are similarly pierced to receive bolts 40 attaching the base 42 of motor 18 to the rear of the frame. The arms of the frame adjacent their free ends are provided with aligned cylindrical formations 44 and 46 constituting supporting members for the blade carrying means to be described.

Each of the supporting members carries a bearing member such as member 48, Figure 3, tightly fitted therein. The upper bearing carries for rotation a hollow pulley shaft 50, on the upper end of which is mounted a pulley 52, secured thereon by set screw 53. A blade receiving member 54 is slidably mounted in the pulley shaft but prevented from relative rotation by key 55 fitting in keyways, not shown, in members 50 and 54. The head 57 serves as an abutment for compression spring 58 which is seated on the upper face of the pulley 52. The blade receiving member is provided with a small bore 59 to freely receive a cutting blade and with a set screw 60 to anchor such blade therein.

The blade supporting means carried by lower member 46 is similar to that just described except that the compression spring may be omitted and the blade receiving member may be fixedly secured in the hollow pulley shaft.

The cutting blade means 62 is a slender, filamentary element, cylindrical in form and having cutting means about its entire periphery formed by a continuous, helical, sharp edged ridge, the maximum lateral dimension of the blade means being of the order of one-sixteenth inch or less. The blade, which may be of the usual class of steel used for coping saw blades, is quite flexible and may be readily deflected by lateral forces such as the force exerted by a work piece being cut, unless it is maintained in substantial tension while rotating. This is taken care of by the manner of mounting in the machine.

To mount the blade, its one end is inserted in the bore of the lower blade receiving member and it is then anchored therein by the set screw. The upper blade receiving member is then forced down against spring 58 by hand pressure and, while it is held depressed, the upper end of the blade is inserted in the bore and anchored. Upon release of the hand pressure the spring will urge the blade receiving member upward and exert substantial and continuing tension on the blade to hold it taut and in alignment with the axes of the bearings.

A horizontal sheet metal saw table 63 is mounted to the upright member of the frame by an integral bracket 64 and bolts 65. Brace 66 provides additional support and rigidity. An aperture is provided in the table in alignment with the axes of the bearings for passage of the blade 62.

Motor 18 is double ended and carries pulleys 67 which drive pulleys 52 thru a pair of belts 68. The driving pulleys are substantially larger than the driven pulleys to obtain the high rotational speed of blade 62 which is desired. Best results are obtained by driving both ends of the blade but the lower pulleys and belt may be omitted without serious disadvantage.

A simpler type of tool particularly designed for use with a hobbyist's standard electric drill is illustrated in Figures 6 and 7. The support, formed of sheet metal, includes a base 69 having attachment flanges 70, base plate 72, and a vertical standard 73 which is channel shaped in cross section. Intermediate the ends of the standard are forwardly extending arms 74 curled inwardly at their ends and having depending tabs 75 forming hollow bosses adapted to seat over the casing bolt heads at the forward end of the drill casing.

The base plate 72 carries an adjustable screw threaded boss 77 having a tapered end adapted to seat in a countersink in the rear face of the drill casing substantially in line with the axis of the drill drive shaft and a cross pin 78 by means of which the boss 77 may be adjusted to clamp the drill securely between bosses 75 and 77. The upper side plates of the standard are bent inwardly to form a flat attachment surface for frame 79. The latter is made in substantially the same way as frame 16 in Figure 1 and its lower flanges 80 are secured to the standard by means of bolts 82.

The cylindrical supporting members 83 and 84 are similar to members 44 and 46 of Figure 1. However the first described bearing means is supplanted by an antifriction bearing. As best seen in Figure 8, the outer race 85 is tightly gripped in supporting member 83. The blade receiving means consists of a shank 87 tightly fitted in the inner race 88 of the bearing and having an enlarged head 89 to prevent axial slippage in use. The lower end of the shank is provided with an axial slot 90 communicating with a lateral slot 91 to receive the rectangularly bent end portion 92 of the cutting blade means 93 which is otherwise similar to the blade means 62.

The lower blade receiving means and bearing arrangement are substantially identical except that they are inverted. The head 94 has a second shank 95 integral therewith which extends downwardly. Upon assembly this shank is gripped in the chuck 97 carried by the driving shaft of the drill. Upon actuation of the drill motor the shank 95 is rotated together with its associated blade receiving means 98. The latter in turn drives blade 93, and the upper blade receiving means turns freely in its bearing.

Work table 99 is substantially identical with work table 63, being supported on the frame 79 by brackets 100 and 102.

It is equally necessary to tension the blade means in this form of the invention to resist lateral deflection. To accomplish this, the dimensions of the elements are so chosen that, in normal unstressed condition of the frame, the anchorage points on members 87 and 98 are slightly farther apart than the corresponding anchorage points of the blade means 93. In assembly, the upper free end of the frame is forced down by springing the frame, which is resilient enough for this purpose, anchoring the blade means in members 87 and 98, and releasing the pressure to apply and maintain tension in blade means 93.

Work benches in some instances are so high that mounting base 69 thereon would locate work table 99 in an inconvenient position. The rear wall 103 of standard 73 is flat and is provided with apertures 104. It may therefore be positioned against a flat front face of a work bench with flange 80 resting on the work surface and attached in place by fasteners passed thru apertures 104. Additional fasteners may be inserted thru flange 80.

The arrangement of Figure 9 is designed to produce a portable cutting tool. The frame 105 is generally similar to those previously described but the lateral flanges 107 are at the inner periphery. The planar flanges 108 are extended downwardly at 109 and have lateral foot portions 110 which are directly attached to the drill casing by bolts 112. The supporting members 114, their associated bearings, and the blade receiving means 115 and 117 are all identical with the corresponding members of Figure 6 and are assembled with blade 118 in the same manner.

The arrangement shown in Figure 10 represents the device of Figure 9 brought down to a substantially irreducible minimum. Frame 119 is formed in the same way as frame 105 but carries a supporting member 120 and blade receiving means 122 only at its upper free end. Flanges 123 have downward extensions 124 with lateral foot portions 125 attached to the drill casing by bolts 127. In this form of the invention the chuck 128 of the drill serves as the lower supporting member for the blade receiving means 129. Blade means 130 is assembled in the same manner as previously described.

It is contemplated that the spring tensioning means of Figures 1 to 3 may be replaced by a threaded assembly for vertically adjusting blade receiving means 54 to tension blade means 62. The blade receiving means of the other forms disclosed can be adjusted in the same manner.

Instead of a spiral cutting edge the blade means may have substantially axially extending cutting edges and take the cross sectional forms illustrated in Figures 11 and 12, the latter being particularly desirable from the manufacturing standpoint. The spiral type is now commercially available for coping saws and may be used directly, merely by cutting or breaking to proper length. The material is tough enough to be bent to form anchorages such as illustrated at 92.

It will be apparent to those skilled in the art that various changes and modifications may be made in the constructional forms disclosed without departing from the invention, and it is intended that all such changes and modifications shall be embraced within the scope of the following claims.

I claim:

1. A cutting tool comprising: a frame; a pair of spaced, substantially parallel arms on said frame; aligned bearing means adjacent the end of each arm; blade receiving means mounted for rotation in each of said bearing means; filamentary cutting blade means axially aligned with said blade receiving means and attached thereto under substantial tension to rotate therewith; said blade means having longitudinally extensive side cutting teeth made operative for cutting action by continuous rotation thereof; the inherent stiffness of said blade means being insufficient to resist lateral deflection caused by lateral forces; said blade means being maintained substantially straight solely by said tension; and shaft means carried by at least one of said blade receiving means adapted for attachment to a rotary power driving means.

2. A cutting tool comprising: a generally U-shaped frame; bearing means at the free ends of said frame; blade receiving means mounted for rotation in each of said bearing means; filamentary blade means having an abrading surface and attached at its ends to said blade receiving means for rotation about its own axis; said abrading surface being made operative by continuous rotation about the axis of said blade means; said frame and bearing means including means to continuously apply substantial axial tensions to said blade means during rotation thereof; said blade means having insufficient stiffness to resist lateral deflection caused by lateral forces and being maintained substantially straight solely by the tension produced by said blade receiving means; and power driving means connected to at least one of said blade receiving means to continually rotate it and thereby rotate said blade means to produce an abrading action.

3. A cutting tool comprising: a frame having a pair of spaced, substantially parallel arms, each having a free end; bearing means adjacent the free ends of said arms; blade receiving means mounted for continuous rotation in said bearing means; filamentary cutting blade means attached to said blade receiving means and having a lateral dimension not in excess of one-sixteenth inch; said blade means having longitudinally extensive side cutting teeth made operative for cutting action by continuous rotation thereof; and means to maintain substantial axial tension in said blade means to resist lateral deflection by lateral forces.

4. A cutting tool comprising: a frame; support means on said frame including a pair of spaced supporting members; blade receiving means rotatably supported on said supporting means; filamentary cutting blade means, having longitudinally extensive side cutting teeth, extending between and attached to said blade receiving means for rotation therewith about its own axis, said blade means having a maximum lateral dimension of the order of one-sixteenth inch; said blade means being mounted under substantial tension to resist lateral deflection by lateral forces; and means on at least one of said blade receiving means adapted for attachment to a rotary power driving means.

5. A cutting tool comprising: spaced blade receiving means; filamentary cutting blade means carried by said blade receiving means and having longitudinally extensive side cutting teeth made operative for cutting action by continuous high speed rotation of said blade means, the stiffness of said blade means being insufficient to resist lateral deflection by lateral forces; and supporting means, at least a portion of which is resilient, supporting said blade receiving means for rotation in spaced relation and resiliently maintaining said blade means in substantial tension to resist lateral deflection.

6. A cutting tool attachment for mounting on the body of a portable drill comprising: a frame having spaced supporting members; blade receiving means mounted in axial alignment for rotation on said supporting members; and an extension on said frame having means for attachment to said drill body to hold said frame in fixed position with respect thereto and with said blade receiving means in longitudinal alignment with the driving shaft of said drill; one of said blade receiving means having a portion formed for driving engagement with said driving shaft.

7. A cutting tool attachment for mounting to the body of a portable drill having a driving shaft, comprising: a base provided with means for attachment to a support, said base having an upstanding extension; a generally C-shaped frame fixedly attached to the upper end of said extension and extending laterally thereof, and having at least one free end constituting a supporting member; blade receiving means mounted on said supporting member for rotation about a substantially fixed axis substantially parallel to the longitudinal axis of said extension; and means on said base and said extension to engage said drill body at spaced points to fixedly support it with the axis of rotation of its driving shaft in alignment with the axis of rotation of said blade receiving means.

8. A cutting tool attachment for connection to the body of a portable drill comprising: a frame having spaced supporting members; blade receiving means mounted in axial alignment for rotation on said supporting members; said frame having means for attachment to said drill body to hold said frame in fixed position with respect thereto and with said blade receiving means in axial alignment with the driving shaft of said drill; one of said blade receiving means having a portion formed for driving engagement with said driving shaft.

9. A cutting tool comprising: a frame having a pair of laterally extending arms; aligned bearing means adjacent the free end of each arm; blade receiving means mounted for continuous rotation in each of said bearing means; motor means attached to said frame and connected to one of said blade receiving means to produce continuous rotation thereof; filamentary cutting blade means, having longitudinally extensive side cutting teeth made operative for cutting action by continuous rotation thereof, axially aligned with said blade receiving means and attached at its ends thereto under substantial tension to rotate therewith; the inherent stiffness of said blade means being insufficient to resist lateral deflection caused by lateral cutting forces; said blade means being maintained substantially straight solely by said tension.

10. A cutting tool attachment as claimed in claim 6, said extension being provided at the end opposite said frame with a base having means for attachment to a fixed support other than said drill body.

J. EDWIN COATES.

References Cited in the file of this patent

UNITED STATES PATENTS

| Number | Name | Date |
|---|---|---|
| 598,729 | Jones | Feb. 8, 1898 |
| 1,263,385 | Delas | Apr. 23, 1918 |
| 1,451,079 | Millsaps | Apr. 10, 1923 |
| 1,628,526 | Boyd | May 10, 1927 |
| 1,762,872 | Manley | June 10, 1930 |
| 1,771,764 | Beattie | July 29, 1930 |
| 1,781,564 | Beattie | Nov. 11, 1930 |
| 1,808,228 | Hulack et al. | June 2, 1931 |
| 2,004,580 | Meyer | June 11, 1935 |
| 2,383,871 | McNeely | Aug. 28, 1945 |
| 2,570,700 | Marcerou | Oct. 9, 1951 |

FOREIGN PATENTS

| Number | Country | Date |
|---|---|---|
| 6,335 | Great Britain | Mar. 26, 1901 |
| 88,895 | Sweden | Mar. 31, 1937 |
| 507,876 | France | July, 1920 |
| 928,643 | France | Dec. 3, 1947 |